J. H. WEDIG.
INTERNAL COMBUSTION ENGINE.
APPLICATION FILED APR. 29, 1918.

1,421,632.

Patented July 4, 1922.
5 SHEETS—SHEET 1.

Inventor
John H. Wedig
per H. M. Raistrd.
Attorney

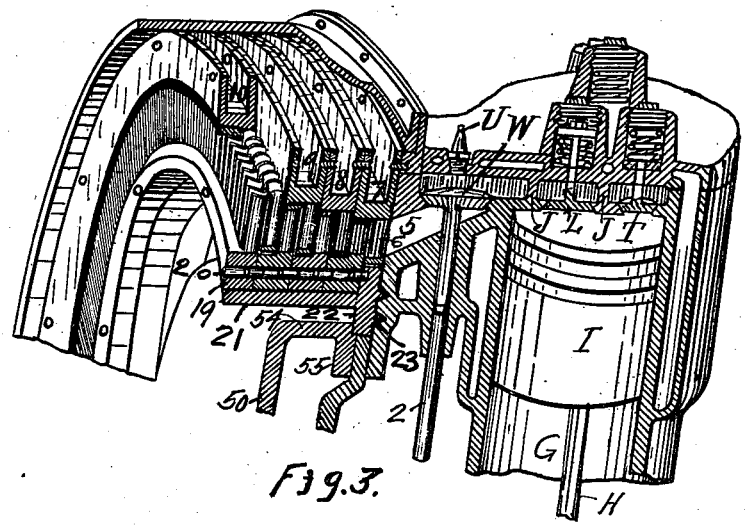
Fig. 3.
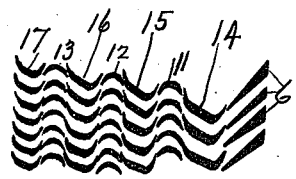
Fig. 4.
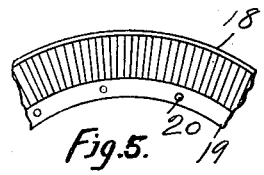  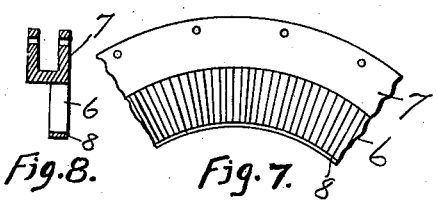
Fig. 5.   Fig. 6.   Fig. 8.   Fig. 7.

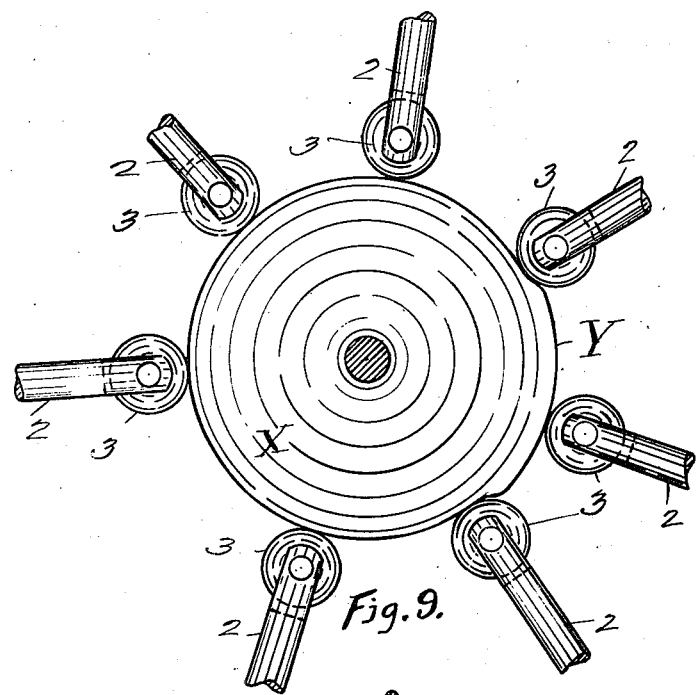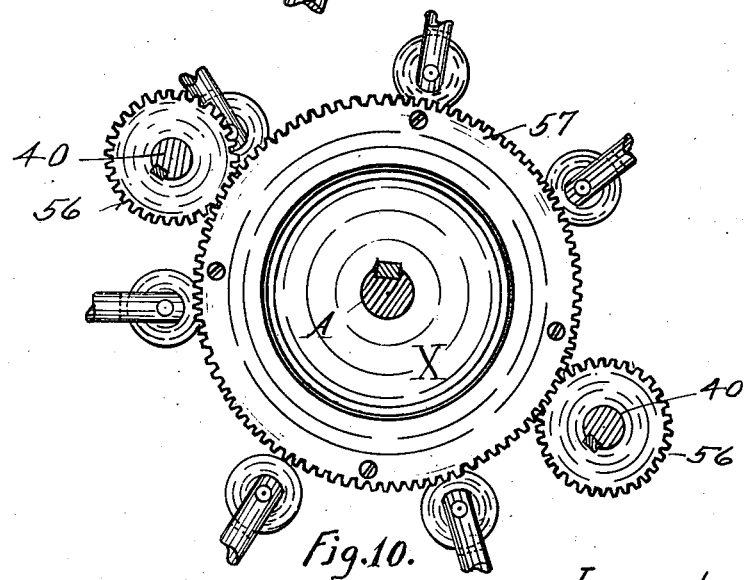

UNITED STATES PATENT OFFICE.

JOHN H. WEDIG, OF GRANITE CITY, ILLINOIS, ASSIGNOR, BY MESNE ASSIGNMENTS, TO SUN MOTORS CORPORATION, OF GRANITE CITY, ILLINOIS, A CORPORATION OF ILLINOIS.

INTERNAL-COMBUSTION ENGINE.

1,421,632. Specification of Letters Patent. Patented July 4, 1922.

Application filed April 29, 1918. Serial No. 231,352.

*To all whom it may concern:*

Be it known that I, JOHN H. WEDIG, a citizen of the United States, residing at Granite City, in the county of Madison and State of Illinois, have invented certain new and useful Improvements in Internal-Combustion Engines, of which the following is a specification.

This invention relates to certain new and useful improvements in internal combustion or explosive gas engines particularly of the rotary turbine class.

The object of my invention is to provide a compact, simple and effective gas turbine; the peculiarities of construction of which will be hereinafter described and claimed.

Figure 1:
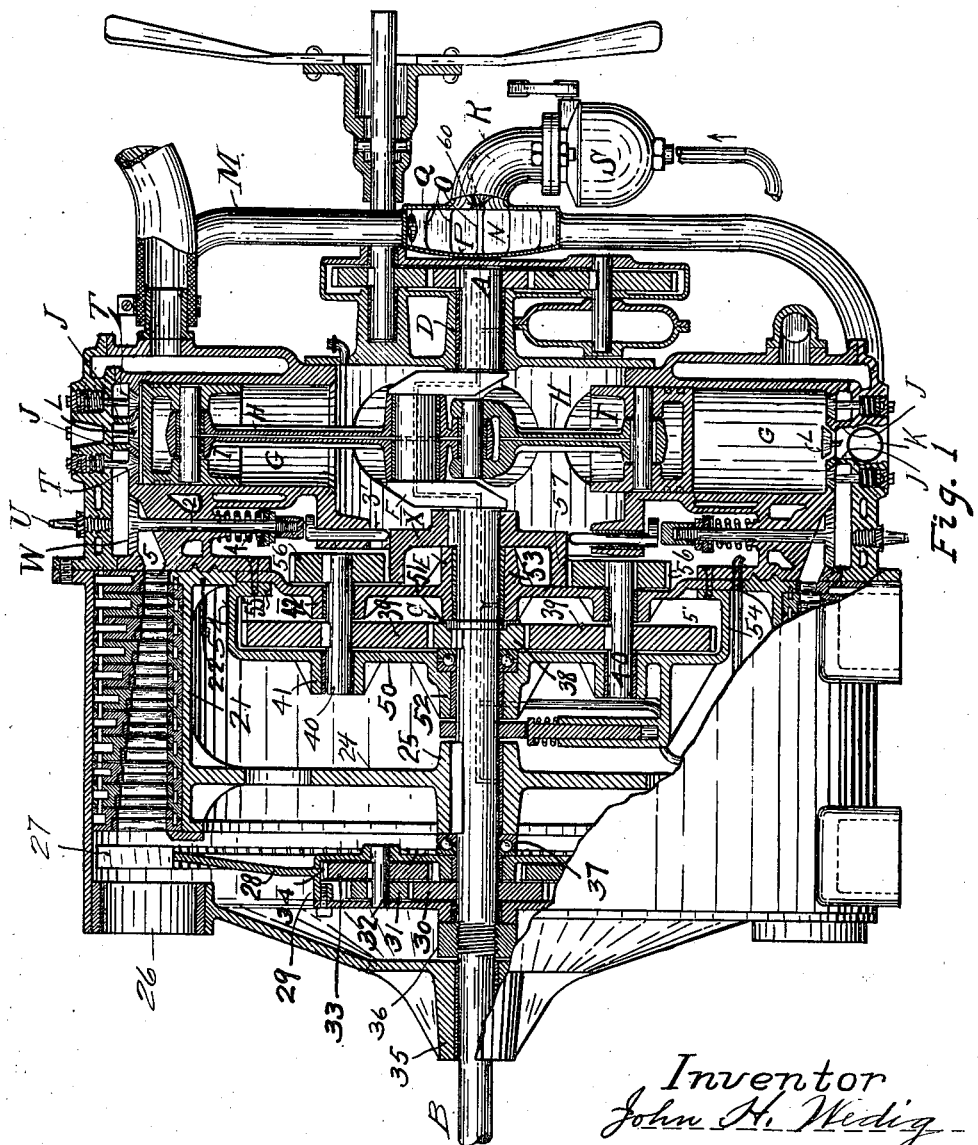
Figure 2:
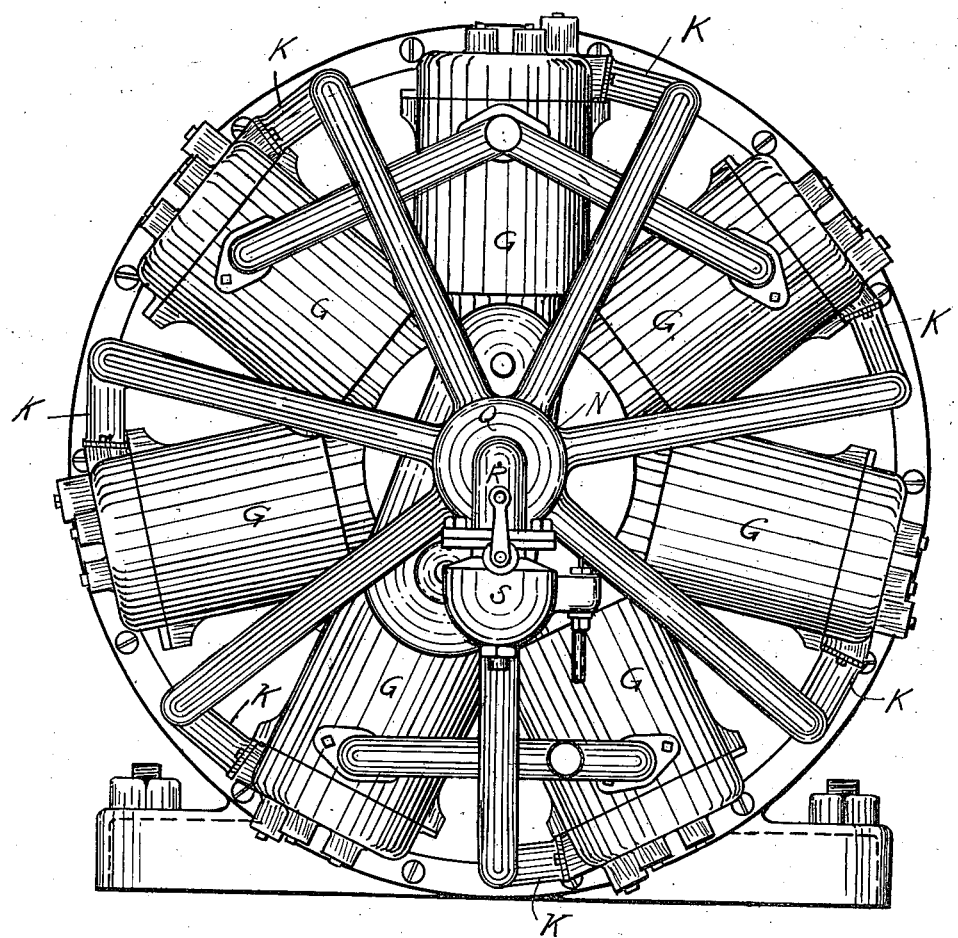
Figure 12:
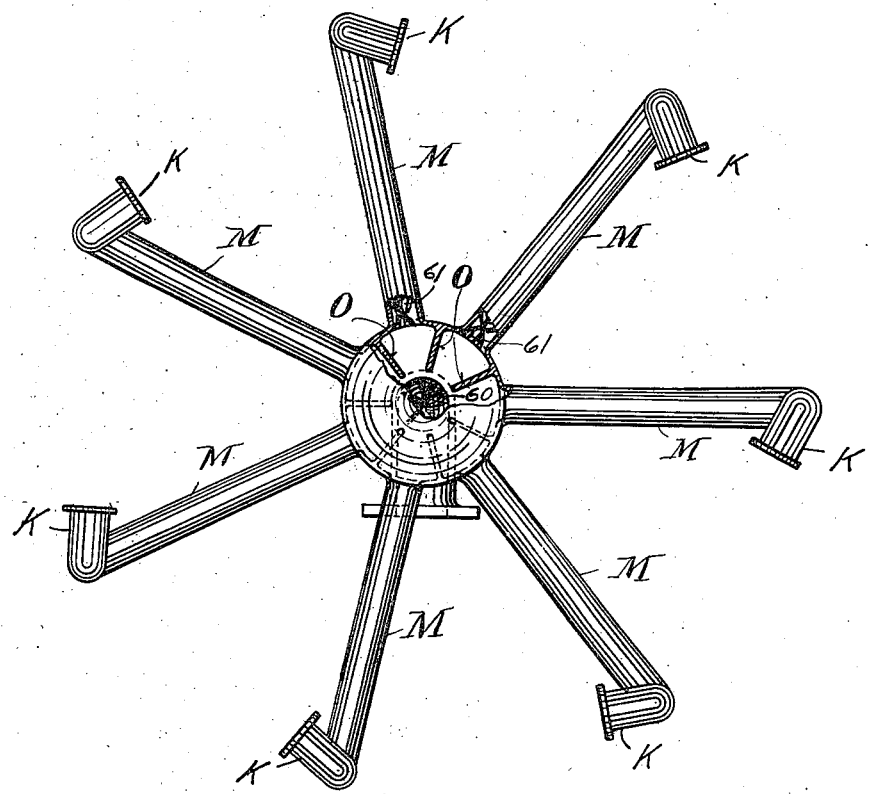
Figure 11:
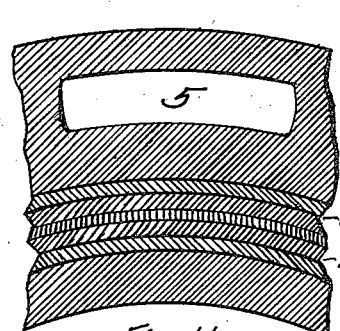
Figure 13:
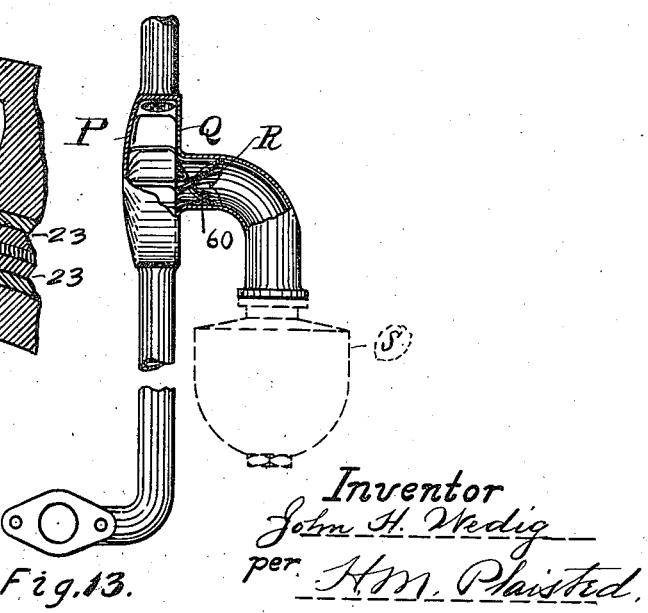

In the accompanying drawings on which like reference characters indicate corresponding parts, Fig. 1 represents a vertical central section and partial side view of a gas turbine exemplifying my improvements;

Fig. 2, an elevation of the fuel distributing end and compression cylinders;

Fig. 3 a partial sectional perspective view of my machine on an axial plane;

Fig. 4 an end view of some of the stationary guide blades and the rotary bucket blades of each set;

Fig. 5 a side view of a portion of one set of turbine bucket blades;

Fig. 6 a cross section of Fig. 5 on a radial plane;

Figs. 7 and 8 similar views of the stationary guide blades;

Fig. 9 a face view of an operative cam and valve rod ends with rollers operated by said cam;

Fig. 10 a face view of a master gear, intermeshed pinions and adjacent mechanism, Fig. 11 an enlarged detail of an exhaust port and grooved joint;

Fig. 12 a detached detail of the fuel distributing chamber in partial section and radiating pipes and, Fig. 13 an edge view and partial section of the same with the carbureter indicated by dashed lines.

My engine consists of two main divisions, the first comprising a crank shaft A operatively connected to a multiple number, preferably odd of radiating cylinders with their valves and fuel pipes connected to a carbureter; and second, a shaft B bearing a turbine wheel within a suitable casing that supports the stationary guides adjacent to the bucket blades of said turbine. The two shafts A and B are in line and form a butt joint at C, and are operatively connected so that the rotation of one shaft,—B in this case,—causes the rotation of the shaft A and the operation of the radially reciprocating cylinders connected to said crank shaft.

In Fig. 1 the crank shaft A is mounted in bearings D and E at each side respectively of the crank arm F, the throw of which is half the stroke of cylinders G, seven of which (or other odd number as may be preferred), are radially arranged as shown in Fig. 2 about the axis of said shaft A. Piston rods H having a common connection to said crank shaft at one end, are pivoted at the other end of each into pistons I reciprocating in said cylinders G. The outer end of each cylinder G has an outer and an inner head, and partition walls J between said heads form a passage leading from the fuel inlet pipe connection K Fig. 2, to the center of the cylinder where an inwardly opening valve L, having a normal closing tendency, admits the charge to the cylinder when the piston makes an inward stroke, and thus draws in the charge through the respective pipe M radiating from a circular flattened drum N having radiating partitions O extending towards the center between the curved front P and disc back Q. The latter has an orifice at the center, connected by a pipe R to a carbureter S. This drum, with the branch pipes M radiating to the respective cylinders, provides an equal share of the charge from the carbureter successively to each cylinder, and the partitions O leading directly to the central orifice in the back Q, insure a uniform quantity of the charge successively supplied to said cylinders by successive inward strokes of the respective pistons. Beside the equal division of the charge by said radiating partitions, I provide means for more thoroughly mixing the air and gasoline vapor from said carbureter, and thereby improve the quality of the charge. Figure 13 shows the pipe R provided with a helicoid 60 located at the central orifice to said drum. The incoming charge from the carbureter is given a whirling motion as it passes the spiral and enters the drum which by its larger area acts as an expansion chamber; then suddenly spreads outward and is again broken up by the edges of the partitions O. I have also shown in Fig. 12 another spiral blade or helicoid 61 at the entrance of the pipes M, in order to break up and intermingle still more thoroughly the portion of the respective charge drawn into said pipes M. Thus a charge that is uniform for each cylinder, both as to quantity and quality, is secured, however the richness may be varied.

Any cylinder having thus drawn in its charge by an inward stroke of the piston, will compress its charge on an outward stroke. This compression takes place outside of the cylinder in the chambered head. The valve L will close at the end of the inward stroke, and during the outward stroke the charge will be forced by the piston out of the cylinder through outwardly opening spring-closed valves T, into the space between said inner and outer heads, which space is of less capacity than each cylinder; whereby the charge is compressed as the cylinder forces it into said chamber, which is in direct proximity, with only the valve L separating it from the cylinder. A spark plug U of the usual or any approved style, ignites this compressed charge at the instant the valves T close at the end of the outward stroke of the piston. This ignition is effected by any well known mechanism and is not shown in detail herein.

This compressed charge is ignited in the compression-ignition chamber, and simultaneously with the ignition an exhaust valve W, seated in the inner wall of the said chamber and opening outward, is actuated by a rotary cam X Fig. 9, having a circular contour on the periphery of a disc; which periphery is a uniform distance from the center except at one portion Y, where the periphery is formed on a greater radius, corresponding to the lift of said valve W. The stem 2 from said valve, extends inward towards said cam, and on the end of the stem is a roller 3, Fig. 9, engaging the cam periphery.

Fig. 1 shows a modification: The roller 3 of Fig. 9 is replaced by a tappet 3', one end of which bears on said cam X and is raised when the swell Y lifts said tappet, which in turn acts on the stem 2 of the valve W. A spring 4 maintains the valve W normally closed. The cam X is keyed to said shaft A.

The valve W having lifted, the exploding gases within said chamber pass through a port 5, directly adjacent to the valve W and leading to guides 6, Figs. 1, 3, and 4. These guides are shown in end view and diagrammatically in Fig. 4, and in detail in Figs. 7 and 8. They consist of radial blades forming buckets, inclined about 35° to the axis of said shafts A and B, and are supported by a U-shaped ring 7 secured to their outer ends, while their inner ends are stayed by a ring, as shown. Fig. 3 shows a plurality of guides of increasing depth, radially, but of substantially the same width, and proportionately larger U-shaped rings 8, 9, and 10. These rings are doweled together as indicated, or otherwise fastened together to form a circular cage with guides 11, 12, and 13, Fig. 4, of regularly increasing length (Fig. 3). Each row of guides is substantially half the width axially, of each U-shaped ring. In the remaining half width in each section is mounted a row of reversely curved buckets 14, 15, 16 and 17, Figs. 3 and 4, having their side edges directly adjacent to the side edges of the guides respectively on each side.

These buckets 14, 15, 16, and 17, are of peculiar shape as shown in Fig. 4: The side edge at the right of each row is practically in line with the guides on the right, which incline downward to the left when viewed from the end as in Fig. 4. The buckets then make a sharp turn upward to the left, or practically 30° with the axis of the shafts, for two-thirds of their width, and then are inclined yet more transversely to the axis, or about 80°, so as to be practically in line with the side edges of the next row of guides on the left. The object of this curve of said buckets, is to facilitate entrance of the exploding gases without shock, into the space between adjacent buckets, by presenting the side edges only of said buckets to the streams of exploding gas delivered from the guides, 6 for instance; then the reverse curve, flattened for two-thirds of the width as indicated in Fig. 4, receives the impulse nearly normal to the flattened curve, but with just sufficient inclination to direct the gases upward to the left into the stationary guides 11. Just before leaving the buckets 14, the gas is directed sharply backwards, or said 80° to the axis, so as to give a decided kick or reaction to this side edge of the moving buckets before leaving the same. The stationary guides 11, 12, and 13 are reversely curved to the rotating buckets, and are practically in the shape of crescent lunes. The object of such shape is to reverse the streams of gas directed backward from the said buckets 14, so as to guide them upon the entering sides of the next set of buckets 15 in the same way that the guides 6 delivered the gas to the buckets 14.

The series of buckets are likewise of successively increased radial length as shown in Fig. 3, and in each row their outward edges are fastened to a ring 18, and their inner ends to a ring 19 of practically the same shape as the U-shaped rings of the guides, but reversed; and they are pinned or doweled or otherwise fastened together as indicated in Fig. 3, so that each ring section 19 is secured to adjacent sections and all rotate as one piece. These bucket ring sections are mounted on a wide rim 21, having a depending flange 22 adjacent to the exhaust ports, provided with one or more V-shaped tongues 23, fitting similar grooves in the side wall adjacent to the ports 5. The rim 21 is carried by a web plate 24 Fig. 1, and hub 25 keyed to shaft B, whereby rotation of said shaft is effected. The object of increasing the radial length of the guides and buckets and thereby the area of the same, is to compensate for the reduced energy remaining in the exploding gas as it travels from the ports 5 to each succeeding row of guides and buckets alternately; that is to say, the larger areas of the buckets at the left compensate for the reduced pressure per square inch of the exploding gas traveling across the rim of the rotary member to the outlet 26 of the casing. This outlet may be connected to any suitable muffler or otherwise.

To facilitate the exit of the spent gas from the turbine and casing, I provide a fan consisting of blades 27 carried by a disc 28 from a hollow hub 29 rotatably mounted on the shaft B. In this hollow hub is a gear wheel 30 keyed to the shaft B, that meshes with a pinion 31 on a shaft 32 parallel to the shaft B and carried by said hollow hub. This shaft 32 has a gear 33 keyed thereon that meshes with internal teeth 34 in the peripheral wall of said hub, whereby said blades 27 are caused to rotate in the opposite direction from the rotary member or turbine. The sides of the hollow hub are bushed for bearing on the shaft B at each side of the gear 30. The effective speed of the fan therefore is the combined angular velocity of the turbine and of the fan, similar in speed effect to two trains passing each other in opposite directions.

The shaft B is reduced at the bearing 35 at the left of the fan, and on the enlarged portion at the right of said bearing, a nut 36 is threaded to take up the end play of said fan adjacent, and preserve its proper adjustment with regard to the turbine member. A thrust bearing, preferably of the ball and cup ring style, is shown at 37 between the hollow hub of the fan and the hub of the turbine.

We will now take up the motive power of the reciprocating members. The shaft A receives its rotation through interconnecting gear mechanism which rotates the shaft A at a much lower speed relatively to that of the shaft B. In other words, the turbine and the shaft B on which it is keyed, is designed to rotate at a high speed, and the crank shaft A is driven from said shaft B by a train of gearings that reduces the angular velocity of the shaft A to a relatively small but definite number of revolutions. Keyed to the right hand end of the shaft B, is a pinion 38 that meshes with two or more gears 39, keyed on shafts 40, mounted on bearings 41 and 42 in two discs 50 and 51, at the left and right respectively of the joint between the shafts A and B. The discs 50 and 51 are fixed to the side wall by screws as shown, and a bushed hub 52 at the left of said pinion 38 forms a stationary supporting bearing for the right hand end of shaft B. The disc 51 has a similar supporting bearing for the left hand end of crank shaft A by means of a hub 53. Said discs are connected by a peripheral flange 54 and depending flange 55, securely jointed and screwed together so as to form a stationary hollow casing or drum for the intermeshed pinion and gears 38 and 39. The gear shafts 40, however, project through the disc 51 to the right of said drum casing, and on the projecting ends are keyed pinions 56 which mesh with a toothed flange 57 integrally as in Fig. 1, or otherwise connected, as in Fig. 10, to the aforementioned cam disc X which is keyed to the crank shaft A. This toothed cam X is thus rotated and likewise the crank shaft A on which it is keyed, and by such rotation the reciprocating pistons draw in, and compressively expel their respective charges into their respective ignition chambers, from which the cam-operated valves W release said exploding charges successively, to provide successive streams of exploding gas through the valve ports 5 and the alternating series of guides and buckets opposite said ports.

I claim:

1. An internal combustion engine provided with bearings, a turbine shaft and a crank shaft mounted in said bearings, a turbine wheel mounted on its shaft, a train of wheel work connecting said turbine shaft and crank shaft, a multiple number of cylinders radially disposed about said crank shaft and operatively connected thereto, a source of fuel supply connected to a central distributing drum, pipes connecting said drum to the respective cylinders, helicoidal spirals mounted at the inlet and outlet openings of said drum to give a whirling motion to the fuel charge being drawn into said cylinders successively, operative valves and means for ignition, all substantially as described.

2. An internal combustion engine comprising a suitable casing provided with bearings, a turbine wheel and shaft mounted in said casing, a series of radially disposed cylinders, compression chambers, operative valves and means for ignition, and a central fuel-distributing drum having radiating pipe connections to said cylinders and radiating partitions intermediate of said pipes and a central inlet orifice, a pipe connecting said orifice with a carburetor and having a spiral helicoid adjacent to said orifice, all substantially as described and for the purpose set forth.

3. An internal combustion engine comprising a plurality of cylinders in combination with a central fuel-distributing drum, supply pipes leading from said drum to the respective cylinders, and radially disposed partition walls in the drum between the inlet-ends of the several pipes.

4. An internal combustion engine comprising a plurality of cylinders in combination with a central fuel-distributing drum, supply pipes leading from said drum to the several respective cylinders, and a helicoidal spiral in each of said pipes to give a whirling motion to the fuel charge being drawn therethrough to the cylinders.

5. An internal combustion engine comprising a plurality of cylinders in combination with a central fuel-distributing drum, supply pipes leading from the drum to the several respective cylinders, and a helicoidal spiral at the inlet of the drum for giving a whirling motion to the fuel-charge being drawn thereinto.

6. An internal combustion engine comprising a plurality of cylinders in combination with a central fuel-distributing drum, supply pipes leading from the drum to the several respective cylinders, and helicoidal spirals mounted at the inlet and outlet openings of said drum to give a whirling motion to the fuel-charge being drawn into said cylinders successively.

In testimony whereof I have affixed my signature in the presence of two witnesses.

JOHN H. WEDIG.

Witnesses:
H. M. PLAISTED,
J. C. STEELE.